United States Patent [19]
Brown

[11] Patent Number: 5,160,931
[45] Date of Patent: Nov. 3, 1992

[54] INTERFEROMETRIC SYNTHETIC APERTURE DETECTION OF SPARSE NON-SURFACE OBJECTS

[75] Inventor: William M. Brown, Ann Arbor, Mich.

[73] Assignee: Environmental Research Institute of Michigan, Ann Arbor, Mich.

[21] Appl. No.: 762,901

[22] Filed: Sep. 19, 1991

[51] Int. Cl.$^5$ .................. G01S 13/90; G01S 15/89
[52] U.S. Cl. ................................ 342/25; 367/88
[58] Field of Search ....................... 342/25; 367/88

[56] References Cited

U.S. PATENT DOCUMENTS

| | | | |
|---|---|---|---|
| 3,121,868 | 2/1964 | Hausz et al. | 343/5 |
| 3,178,711 | 4/1965 | Case, Jr. | 343/16 |
| 3,228,028 | 4/1966 | Baum et al. | 343/9 |
| 3,603,992 | 9/1971 | Goggins, Jr. | 343/5 R |
| 3,725,915 | 4/1973 | Herman et al. | 343/5 |
| 3,768,096 | 10/1973 | Dentino | 343/7 |
| 3,838,424 | 9/1974 | Goldfischer | 343/8 |
| 3,905,031 | 9/1975 | McCord | 343/5 |
| 3,993,994 | 11/1976 | Goggins | 342/25 |
| 4,034,370 | 7/1977 | Mims | 343/5 |
| 4,045,795 | 8/1977 | Fletcher et al. | 343/5 |
| 4,064,510 | 12/1977 | Chabah | 343/7.5 |
| 4,084,158 | 4/1978 | Slawsby | 343/5 |
| 4,134,113 | 1/1979 | Powell | 343/5 |
| 4,163,231 | 7/1979 | Zuerndorfer et al. | 343/5 |
| 4,184,155 | 1/1980 | Silvertson, Jr. | 343/5 |
| 4,321,601 | 3/1982 | Richman | 343/5 |
| 4,325,065 | 4/1982 | Caputi, Jr. | 343/5 |
| 4,355,311 | 10/1982 | Jain | 343/5 |
| 4,546,354 | 10/1985 | Boles | 343/17 |
| 4,546,355 | 10/1985 | Boles | 343/17 |
| 4,551,724 | 11/1985 | Goldstein | 343/5 |
| 4,563,686 | 1/1986 | Boles | 343/17 |
| 4,611,208 | 9/1986 | Kane et al. | 343/5 |
| 4,636,719 | 1/1987 | Zuk et al. | 343/83 |
| 4,723,124 | 2/1988 | Boles | 343/25 |
| 4,727,373 | 2/1988 | Hoover | 343/25 |
| 4,815,045 | 3/1989 | Nakamura | 367/88 |
| 4,825,213 | 4/1989 | Smrek | 342/25 |
| 4,866,446 | 9/1989 | Hellsten | 342/25 |
| 4,922,254 | 5/1990 | Schuessler et al. | 342/25 |
| 4,961,075 | 10/1990 | Ward | 342/140 |
| 4,975,704 | 12/1990 | Gabriel et al. | 342/25 |
| 4,999,635 | 3/1991 | Niho | 342/25 |

OTHER PUBLICATIONS

"Studies of Multi-Baseline Spaceborne Interferometric Synthetic Aperture Radars"; Li et al, Proceedings of IGARSS '87 Symposium, May 18–21, 1987.

*Primary Examiner*—Gilberto Barrón, Jr.
*Attorney, Agent, or Firm*—Krass & Young

[57] ABSTRACT

A technique for detecting non-surface objects from a moving platform using radiant ranging. The platform moves perpendicular to a line through a pair of first and second transducers. A transmitter repeatedly transmits a radiant signal via a first transducer. The return reflection signals in both transducers include return reflection signals from sparse non-surface objects in the presence of surface clutter reflections. Respective synthetic aperture complex images of resolution cell in slant range and Doppler frequency are formed from the received reflections of the two transducers. The complex phase factor between received reflections for each resolution cell in the absence of non-surface objects is determined. This is feasible because the non-surface objects are sparse, that is rare and generally encountered individually. Each resolution cell of the first synthetic aperture complex image is multiplied with the complex conjugate of the corresponding resolution cell of said complex phase factor. The resulting product signal is subtracted from the second synthetic aperture complex image. The resulting signal is non-zero (except for second order effects) only in the presence of a non-surface reflecting target. The technique may employ a third transducer permitting detection of non-surface objects at otherwise blind heights.

25 Claims, 6 Drawing Sheets

INTERFEROMETRIC SYNTHETIC APERTURE DETECTION OF SPARSE NON-SURFACE OBJECTS

TECHNICAL FIELD OF THE INVENTION

The technical field of this invention is surface clutter reduction in radiant ranging systems which enhances detection of non-surface objects.

BACKGROUND OF THE INVENTION

In synthetic aperture radar the motion of the aircraft is employed to achieve greater angular resolution than obtainable by antennas that can be mounted on the aircraft. The motion of the aircraft permits formation of a synthetic antenna that is larger in size than the real antenna. This large synthetic antenna has an angular resolution corresponding to the angular resolution of an equally large physical antenna. The aircraft flies in a predetermined path and repeatedly transmits a radar signal. It is typical for this radar signal to be directed to the side of the flight path via a small antenna. This cross track view may be directly perpendicular to the flight path or at some angle less than perpendicular. The same antenna is employed to receive return echoes of the transmitted signal.

The return echo signals are processed in two dimensions. The time to receive an echo return from any particular piece of terrain corresponds to its slant range from the aircraft. This range is called slant range because it typically follows a downwardly slanting path from the aircraft to the ground. The echo returns also have differing Doppler frequencies. The motion of the aircraft imparts a Doppler frequency shift in the echo returns from the stationary ground. Areas directly ahead of the aircraft have a maximum closing Doppler frequency, those directly behind have a maximum opening Doppler frequency. Areas at varying angles between these extremes have intermediate Doppler frequencies. The combination of time of return and Doppler frequency permit production of a two dimensional feature map of individual resolution cells in slant range and Doppler frequency. Plural echo returns can be processed together with the known path and velocity of the aircraft to produce a composite picture of the area imaged.

There is a problem with this technique. This technique cannot distinguish non-surface from surface objects within the same slant range and Doppler frequency resolution cell. An echo signal within a resolution cell having a particular time of return and Doppler frequency does not define a unique location. Regions of echo return times equal within the limits of measurement lie on a spherical shell centered at the antenna location. Regions of Doppler frequencies equal within the limits of measurement lie on a conical shell having its vertex at the antenna and its axis on the velocity vector of the aircraft. The intersection of these regions forms a vertically disposed circular annulus. Actual echo returns can only come from areas illuminated by the transmissions, so that return areas are further limited to the solid angle cone of the antenna. Still this leaves an ambiguity in the location forming the echo return. Thus a non-surface object, such as an underground object or a flying object, cannot be distinguished from the surface return in the same resolution cell. This is true even though the non-surface object occupies a different physical space than the interfering surface return.

SUMMARY OF THE INVENTION

The present invention is a technique for detecting non-surface objects from a moving platform using radiant ranging such as radar or sonar. The platform moves perpendicular to a line though a pair of first and second transducers. A transmitter repeatedly transmits a radiant signal via at least one of the transducers. Both transducers receive return reflection signals. These return reflection signals include return reflection signals from sparse non-surface objects in the presence of surface clutter reflections.

The two reflection signals are processed to eliminate the surface reflection clutter. Respective synthetic aperture complex images of each resolution cell in slant range and Doppler frequency are formed from the received reflections of the two transducers. The complex phase factor between received reflections for each resolution cell in the absence of non-surface objects is determined. This is feasible because the non-surface objects are sparse, that is rare and generally encountered in isolated resolution cells.

The complex phase factor is determined as follows. Data from each resolution cell of the first synthetic aperture complex image is multiplied by the corresponding resolution cell data of the complex conjugate of the second synthetic aperture complex image. The product signal is averaged over a small region neighboring but not including the corresponding resolution cell. This averaging over a small region of adjacent resolution cells preferably includes the eight peripheral resolution cells of a three by three matrix of resolution cells centered on the corresponding resolution cell. Any resolution cells which have previously been determined as non-surface object resolution cells are also excluded from the average. The modulus or magnitude of the averaged complex data for each resolution cell is extracted. The averaged signal is divided by the modulus signal, thereby producing the complex phase factor for that resolution cell.

The extracted complex phase factor is used in cancelling the ground clutter. First, the data of each resolution cell of a first synthetic aperture complex image is multiplied by the complex conjugate of the data of the corresponding resolution cell of the complex phase factor. The resulting product signal for each resolution cell is subtracted from the second synthetic aperture complex image for the corresponding resolution cell. The resulting signal is non-zero (except for second order effects) only in the presence of a non-surface reflecting target.

BRIEF DESCRIPTION OF THE DRAWINGS

These and other objects and aspects of the present invention will become clear from the following description of the invention, in which.

DETAILED DESCRIPTION OF THE PREFERRED EMBODIMENTS

Figure 1A:
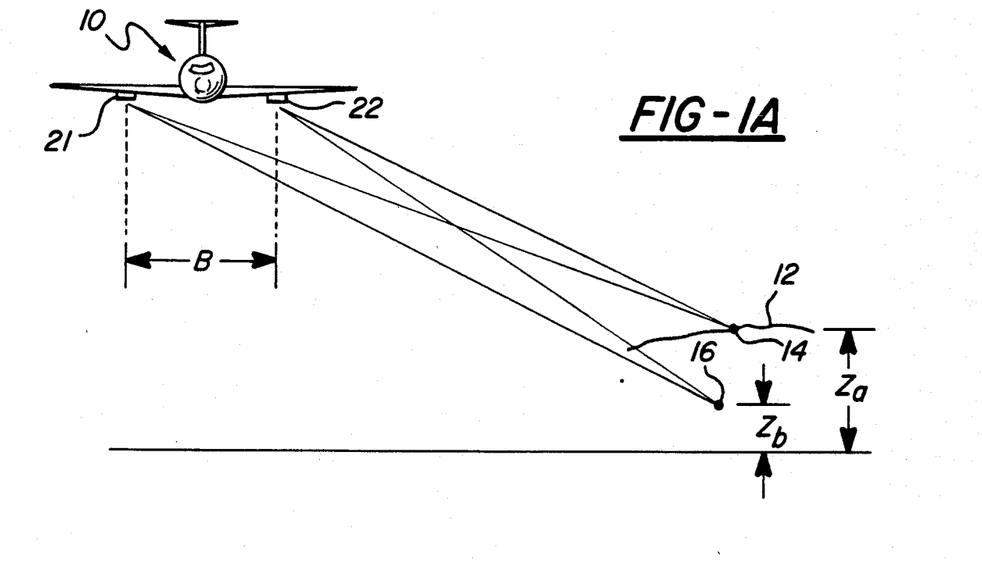
FIG. 1a illustrates the principles of operation of the present invention in a synthetic aperture radar for detection of buried objects.

FIG. 1a illustrates an example of the operation of the synthetic aperture radar of the present invention. Aircraft 10 is illustrated as moving out of the plane of the illustration toward the viewer. Aircraft 10 includes two synthetic aperture radar antennas 21 and 22. The two antennas 21 and 22 are separated by a known distance B. These two antennas 21 and 22 each have the major lobe of their radiation response directed across the path of aircraft 10. In particular, antennas 21 and 22 have their response directed to substantially the same portion of terrain 12. Note that this response need not be directly perpendicular to the flight path of aircraft 10 but may be disposed at a forward-looking angle or a rearward-looking angle.

In operation aircraft 10 flies by the area to be scanned. In the preferred embodiment antenna 21 is active and periodically transmits a complex radar pulse having an average wavelength $\lambda$. Both antennas 21 and 22 receive the return echoes from these transmissions. The signals received at the two antennas 21 and 22 are separately processed in slant range and Doppler frequency according to the prior art. This yields a two dimensional image of terrain 12 indicating the slant range R and the cross track dimension corresponding to the Doppler frequency for each antenna 21 and 22.

Transmissions from antenna 21 illuminate a surface point 14 and a subsurface object 16. Surface point 14 is located on surface 12 at a distance $z_b$ above a reference level, such as sea level. Likewise, subsurface object 16 is disposed at a distance $z_a$ above the reference level. Subsurface object 16 corresponds to some below ground structure capable of producing radar echoes. Examples are mines, underground storage tanks, underground bunkers or the like. It is anticipated that the echo return strength from subsurface object 16 is less than that of surface point 14. It is also anticipated that subsurface objects 16 are sparse, that is most resolution cells in slant range and Doppler frequency will include only the surface return. Surface point 14 and subsurface object 16 are located within the same slant range and Doppler frequency band. Thus absent some processing technique the surface return from point 14 will completely mask the return from subsurface object 16.

Subsurface object 16 is detected by canceling out the surface echo returns. This cancellation technique relies on the fact that the non-surface objects are sparse, that is, most of the echo returns come from only the ground. This permits determination of the ground response for subtraction from the total response. Let $f_1$ be the received signal at antenna 21 and $f_2$ be the received signal at antenna 22. Then:

$$f_1 = ae^{jkr_{1a}} + be^{jkr_{1b}} \quad (1)$$

$$f_2 = ae^{jkr_{2a}} + be^{jkr_{2b}} \quad (2)$$

where: a is the return strength of the subsurface object 16 and b is the return strength of the surface point 14, generally $b > a$; j is the fundamental imaginary number $\sqrt{-1}$; k is $2\pi/\lambda$, where $\lambda$ is the average transmitted bandwidth; $r_{1a}$ is the slant range from antenna 21 to subsurface object 16; $r_{1b}$ is the slant range from antenna 21 to surface point 14; $r_{2a}$ is the slant range from antenna 22 to subsurface object 16; and $r_{2b}$ is the slant range from antenna 22 to surface point 14.

It can be seen that the returns from surface point 14 and subsurface object 16 differ only in slant angle. Note that it is given that surface point 14 and subsurface object 16 are within the same slant range and Doppler frequency resolution cell. From the two echo return signals $f_1$ and $f_2$ it is possible to extract a function g of the phase difference $\Delta r_b$ such that:

$$g = e^{jk(r_{1b} - r_{2b})} = e^{jk\Delta r_b} \quad (3)$$

This is possible because nearly all the echo returns in the region surrounding surface point 14 have only surface returns.

This phase difference function g permits computation of a function q which is non-zero only if a non-surface return is present. Let q be:

$$q = f_2 - f_1 \bar{g} \quad (4)$$

where $\bar{g}$ is the complex conjugate of g. Expanding using equations (1), (2) and (3) yields:

$$q = ae^{jkr_{2a}} + be^{jkr_{2b}} - (ae^{jkr_{1a}} + be^{jkr_{1b}}) e^{-jkr\Delta r_b} \quad (5)$$

Distributing the $\bar{g}$ term over the $f_1$ terms yields:

$$q = ae^{jkr_{2a}} + be^{jkr_{2b}} - ae^{jk(r_{1a} - \Delta r_b)} - be^{jk(r_{1b} - \Delta r_b)} \quad (6)$$

Because $\Delta r_b = r_{1b} - r_{2b}$, the exponent in the final term equals $jkr_{2b}$. Thus the second and the last terms cancel out. If we set $\Delta r_a = r_{1a} - r_{2a}$, then equation (6) becomes:

$$q = ae^{jkr_{2a}} + ae^{jk(\Delta r_a + r_{2a} - \Delta r_b)} \quad (7)$$

Equation (7) by factoring becomes:

$$q = ae^{jkr_{2a}}(1 - e^{jk(\Delta r_a - \Delta r_b)}) \quad (8)$$

The quantity q given in equation (8) is zero in the absence of a non-surface target. Note that in the absence of a nonsurface reflector $\Delta r_a = \Delta r_b$. Thus the exponent in the difference is 0 and the difference is also 0. Since the presence of a non-surface reflector insures that $\Delta r_a \neq \Delta r_b$, q is non-zero when a non-surface target is present.

Figure 1B:
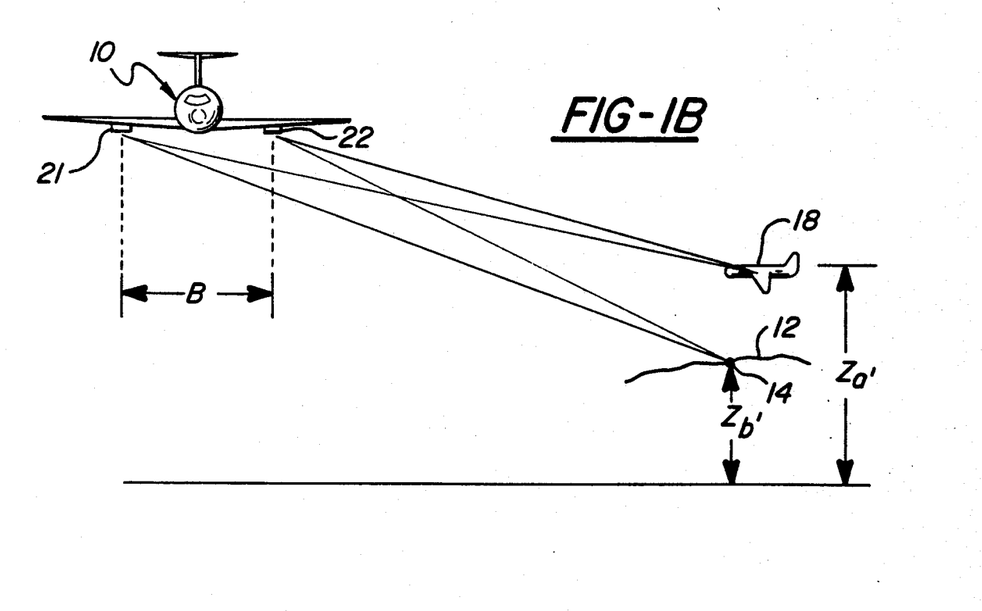
FIG. 1b illustrates the principle of operation of the present invention in a synthetic aperture radar for detection of flying objects.

FIG. 1b is similar to FIG. 1a except that an aircraft 18 is illuminated by the radar transmissions rather than subsurface object 16. Aircraft 18 is disposed at a distance $z_a$ above the reference level. In this case $z_a > z_b$. Like subsurface object 16 shown in FIG. 1a, the echo return from aircraft 18 is masked by the echo return from terrain 12 at surface point 14. The technique of the present invention is equally capable of eliminating the surface clutter for detection of aircraft 18 as for detection of subsurface object 16. The only difference between these two cases is the difference in height above the reference level and slant angle.

Figure 2:
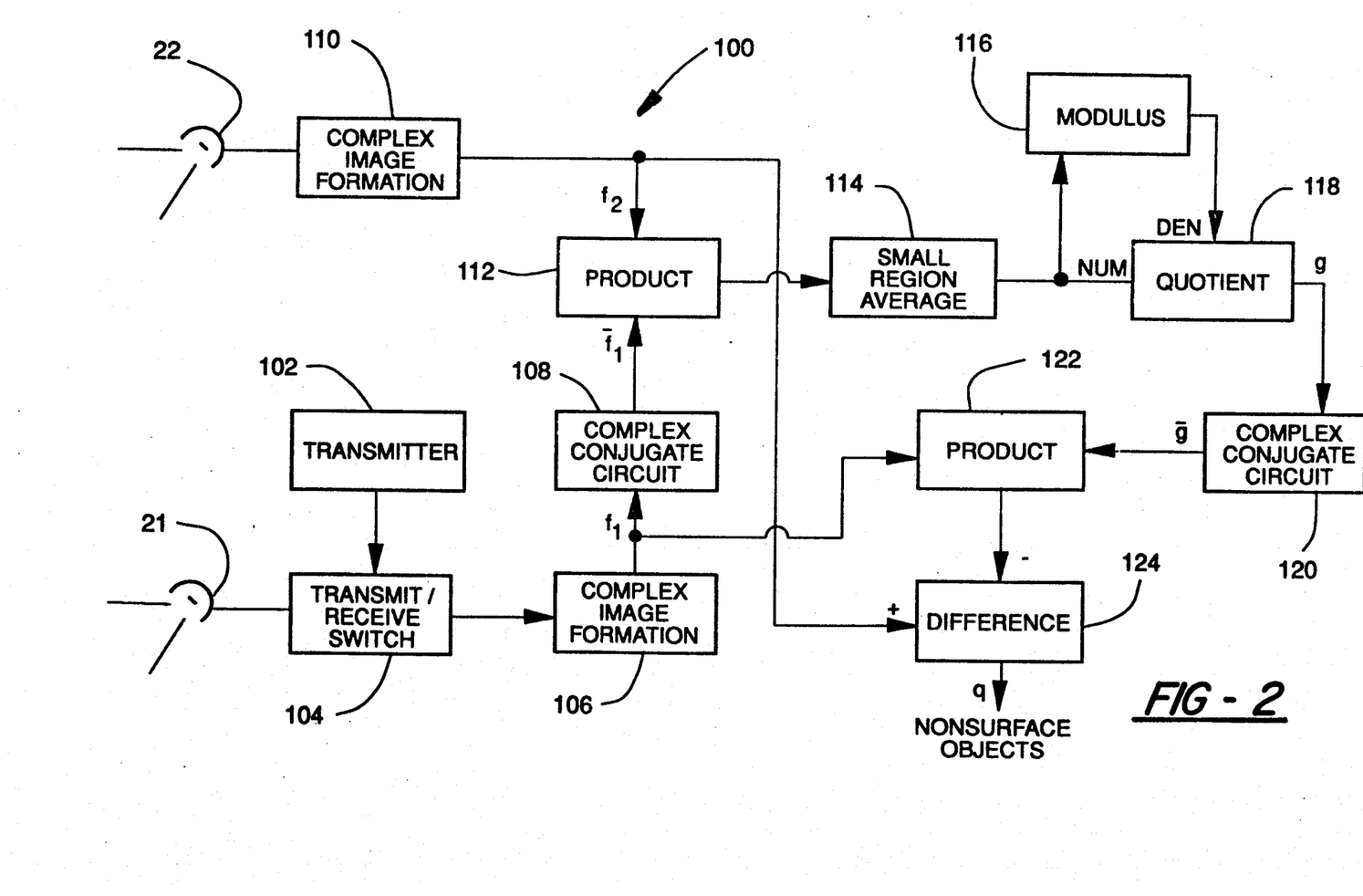
FIG. 2 illustrates in block diagram form an apparatus for practicing the present invention.

FIG. 2 illustrates in block diagram form apparatus 100 for practicing this invention. Apparatus 100 includes transmitter 102. Transmitter 102 periodically generates a radar transmission which is coupled to antenna 21 via transmit/receive switch 104. Apparatus 100 includes two synthetic aperture receivers. Complex image formation receiver 106 produces a slant range and Doppler frequency processed output of the echo returns received by antenna 21 through transmit/receive switch 104. Complex image formation receiver 110 produces a similar slant range and Doppler frequency processed output of the echo returns received by antenna 22. Complex image formation receivers 106 and 110 each produce complex number data for each resolution cell in slant range and Doppler frequency.

The quantity g based upon the phase difference between the echo returns to antennas 21 and 22 is produced using complex conjugates. The product of $f_2$ and the complex conjugant of $f_1$ is:

$$f_2 \times \bar{f}_1 = (ae^{jkr_{1a}} + be^{jkr_{1b}}) \times (ae^{jkr_{2a}} + be^{jkr_{2b}}) \quad (9)$$

Expanding this product yields an $a^2$ term, two ab terms and a $b^2$ term. Since $b > a$, and the non-surface returns are sparse, averaging over an area about the resolution cell of interest permits the $b^2$ term to predominate. Thus:

$$f_2 \times \bar{f}_1 |_{\square ave} = b^2 e^{jk(r_{1b} - r_{2b})} \quad (10)$$

Apparatus 100 exploits the relationship of equation (10) to compute the quantity g.

Computation of the quantity g is performed by complex conjugate circuit 108, product circuit 112, small region average circuit 114, modulus circuit 116 and quotient circuit 118. Complex conjugate circuit 108 computes the complex conjugate of the complex image data of each resolution cell from complex image formation receiver 106 corresponding to the echo returns received by antenna 21. Product circuit 112 forms the product of the complex image data of each resolution cell received from antenna 22 with the conjugate of the complex image data of the corresponding resolution cell from echo returns received by antenna 21.

Small region average circuit 114 averages the product of the complex image of each resolution cell received from antenna 22 with the conjugate of the complex image data of corresponding resolution cells of the echo returns received by antenna 21. Small region average circuit 114 preferably covers a 3 by 3 matrix of resolution cells with the current resolution cell in the center. A preferred embodiment of this circuit is illustrated in FIG. 3.

Figure 3:
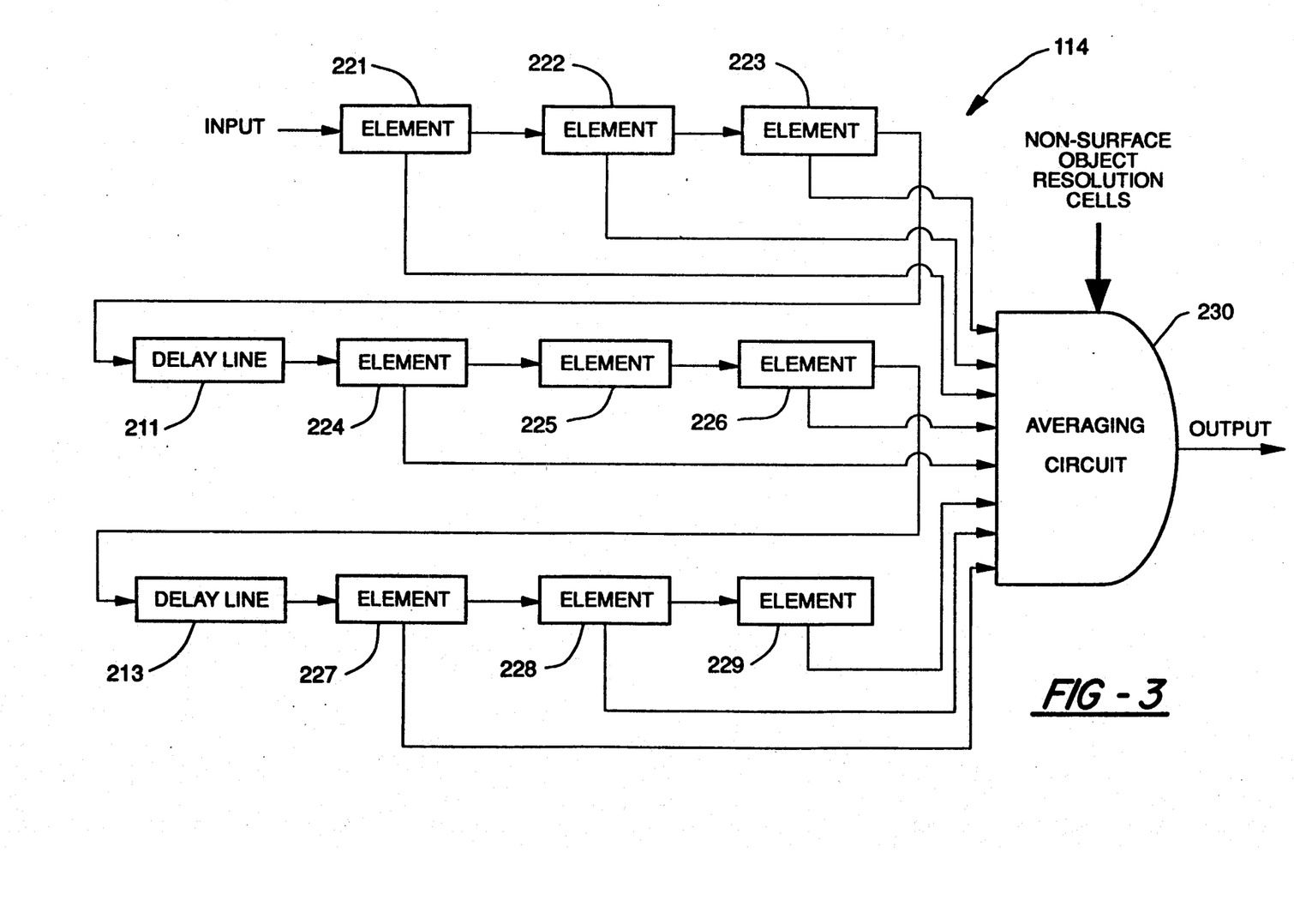
FIG. 3 illustrates in block diagram form the small region average circuit illustrated in FIG. 2.

FIG. 3 illustrates in further detail the construction of an exemplary small region average circuit 114. Small region average circuit 114 operates in conjunction with a delay line formed of resolution cell elements 221, 222 ... 239, and shift register delay lines 213 and 215. Resolution cell elements 221, 222 ... 239 are each capable of storing the bits corresponding to the product signal of a single resolution cell. The number of bits depends on the design choice of slant range and Doppler frequency resolution. The synthetic aperture complex image data formed by complex image formation receivers 106 and 110 are preferably formed in a matrix of slant range values and Doppler frequency values. This data is read out in a raster scan fashion for supply to product circuit 112. It is immaterial whether the data is organized as rows of slant range resolution cells and columns of Doppler frequency resolution cells or vice verse, so long as both complex images are formed in the same fashion and so long as complex data for the corresponding resolution cells from the two images arrive simultaneously at product circuit 112.. Shift register delay lines 213 and 215 have a length equal to three less than the number of resolution cells within each line of the image. Shift register delay lines 213 and 215 must be capable of operating on data words the same size as the complex data of a single resolution cell.

As previously described, resolution cell data is supplied in raster scan fashion to the input of the small region average circuit 114. The resolution cell data is first stored in resolution cell element 221. Upon receipt of the complex data for the next resolution cell, the data stored in resolution cell element 221 is shifted to resolution cell element 222 and the new data is stored in resolution cell element 221. Receipt of the data for the next resolution cell shifts the first data to resolution cell element 223, the second data to resolution cell element 222 with the just received data stored in resolution cell element 221. This process of shifting data along the delay line continues in the direction of the arrows appearing in FIG. 3. Once the data reaches resolution cell element 229, it is discarded upon receipt of data for the next resolution cell. Note that the length of shift register delay lines 213 and 215 has been selected to insure that resolution cell elements 221, 224 and 227 store data corresponding to vertically adjacent resolution cells in the input image. Likewise the data in resolution cell elements 222, 225 and 228 correspond to vertically adjacent resolution cells and the data in resolution cell elements 232, 226 and 229 correspond to vertically adjacent resolution cells.

Small area average circuit 114 operates by presenting appropriate resolution cell data to averaging circuit 230. Note that once the delay line is full, resolution cell elements 221, 222 ... 229 store a 3 by 3 matrix of data from resolution cells which are adjacent in the original image. If resolution cell element 225 represents the center resolution cell, then resolution cell elements 221, 222, 223, 224, 226, 227, 228 and 229 represent the eight immediately adjacent resolution cells. Data from the adjacent elements 221, 222, 223, 224, 226, 227, 228 and 229 are supplied to averaging circuit 230. Thus averaging circuit 230 receives data corresponding to the neighbors of the central resolution cell. Averaging circuit 230 forms the average of the product data of the eight resolution cells. Upon receipt of the data for the next resolution cell, the data shifts so that averaging circuit 230 receives data corresponding to the neighbors of the next resolution cell.

In the simplest case averaging circuit 230 forms the arithmetic mean of the product data of the resolution cells adjacent to the central resolution cell. Averaging circuit 230 could also omit from contributing to the average data for any resolution cells which have previously identified as including non-surface objects.

It is preferable that the phase differences of the resolution cells forming the average be corrected to account for differences in slant range. Note that the phase difference $\Delta\phi$ between the received signal at the two antennas for points on a level plane will change with changes in slant range. This correction preferably assumes that all the resolution cells in the small region are at the same elevation. The nominal change $\phi$ from the phase difference $\Delta\phi_1$ of a first point and the phase difference $\Delta\phi_2$ of a second point is about:

$$\phi = \frac{2\pi B \, \Delta R \, \text{ctn} \, \theta}{\lambda R} \quad (11)$$

where; $\Delta R$ is the change in slant range between the points; the other terms are as previously defined. Note that points in differing Doppler frequency resolution cells having the same slant range need no such correction. The correction is made multiplying each product $f_1 f_2$, by a phase shift factor $e^{j\phi_1}$ prior to averaging. The magnitude of the phase shift $\phi_1$ in each phase shift factor $e^{j\phi_1}$ is dependent upon the distance from the nominal center of the small region. This correction prevents the change in the phase difference $\Delta\phi$ due to change in slant range from overwhelming the other terms of the average.

Those skilled in the art would realize that the principles employed in the circuit of FIG. 3 could also be used for larger matrices, and matrices that are not square. Thus the small region of resolution cells used in forming the average could be of another shape and size than this example. Those skilled in the art would also realize that the circuit illustrated in FIG. 3 is merely a convenient manner for computation of the desired average and that other techniques are feasible. In particular, the complex data for each resolution cell could be stored in a memory. When shifting to form the average for the region surrounding the next resolution cell, the complex data for three new resolution cells is recalled from the memory using dedicated memory pointers and the complex data for the three resolution cells no longer needed is discarded.

Small region average circuit 114 operates to reduce the contribution of non-surface objects to the detected phase difference enabling approximation of the complex phase function from the surface for resolution cells including a non-surface object. The area of small region average circuit 114 must be small in relation to the rate of change of elevation with linear terrain change. This prevents a contribution to the average based on terrain elevation change.

Modulus circuit 116 and quotient circuit 118 form the phase difference function g. Modulus circuit 116 extracts the magnitude $b^2$ from the averaged output $f_2 \times \bar{f}_1$ of each resolution cell of the output of small region average circuit 14. This magnitude is the square root of the sum of the squares of the real part and the imaginary part of the averaged complex data. Quotient circuit 118 forms the quotient of the output of small region average circuit 14 for each resolution cell divided by the output of modulus circuit 116 for the corresponding resolution cell. This yields the phase difference function g.

The quantity q, which is non-zero in the presence of non-surface objects, is computed via complex conjugate circuit 120, product circuit 122 and difference circuit 124. Complex conjugate circuit 120 forms $\bar{g}$, the complex conjugate of g, for each resolution cell. Product circuit 122 forms the product $f_1 \bar{g}$ for each resolution cell. Lastly, difference circuit 124 forms the desired quantity $q = f_2 - f_1 \bar{g}$ for each resolution cell. As previously noted, the quantity q is non-zero only for resolution cells having a non-surface reflector. Thus the apparatus 100 of FIG. 2 detects non-surface objects in the presence of surface return clutter.

Figure 4:
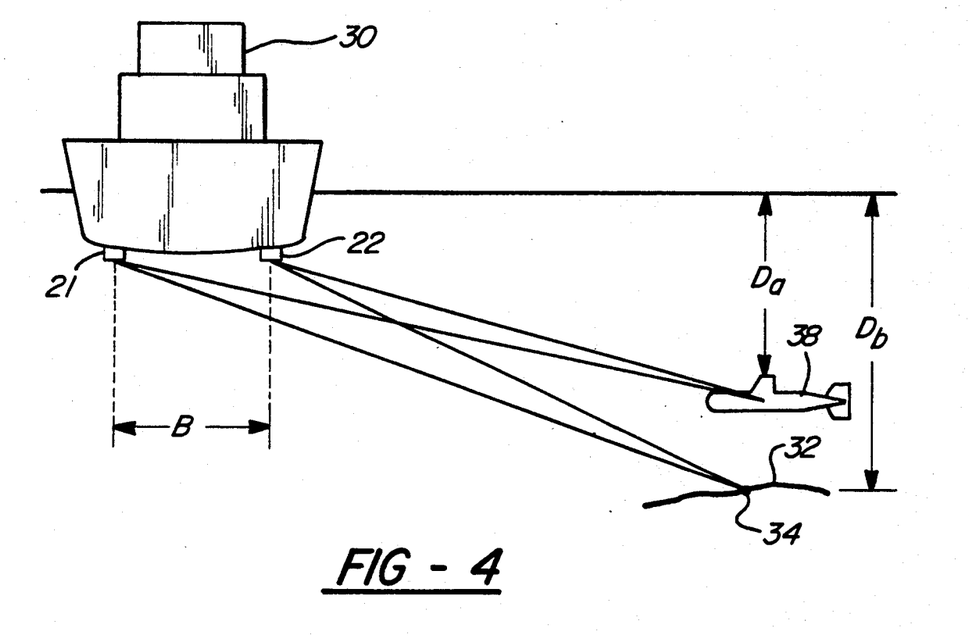
FIG. 4 illustrates the principle of operation of the present invention in a synthetic aperture sonar for detection of underwater objects.

Although the present invention has been described in conjunction with synthetic aperture radar, it is equally applicable to other fields. In particular, this technique may be employed in underwater sonar. FIG. 4 illustrates ship 30 illuminating sea bed 32 and submarine 38 by sonar transmissions. Submarine 38 is disposed at a distance $D_a$ below sea level. Sea bed point 34 is disposed a distance $D_b$ below sea level. The echo return from submarine 38 is masked by the echo return from sea bed 32 at sea bed point 34. In this case transducers 21 and 22 are electro-acoustic transducers capable of producing and receiving underwater sound waves.

The technique of the present invention is equally capable of eliminating the sea bed clutter for detection of submarine 38. The capability of detecting non-surface objects in the presence of sea bed return clutter would also, for example, permit the detection of buried sea bed objects, schools of fish, underwater mines or the like. The apparatus for clutter elimination for sonar would be as illustrated in FIGS. 2 and 3 and previously described. The only difference relative to the apparatus for radar would be a consequence of the differing frequency of operation and slower propagation velocity of sonar relative to radar. The essential feature is the capability of extracting the phase difference function between two receiving transducers for the sea bed return, which enables cancellation of the sea bed return clutter.

The technique just described has a drawback. The computed quantity q as defined by equation (8) is periodic in $\Delta r_a - \Delta r_b$. This means that there are periodic heights of the non-surface object where $jk(\Delta r_a - \Delta r_b)$ equals an integral multiple of $2\pi$. These heights are "blind" because the a non-surface object at any of these heights is invisible to the system. Note that $jk)\Delta r_a - \Delta r_b)$ is a function of both the average wavelength (because $k = 2\lambda/\pi$) and of the interferometer baseline length B. It can be shown that:

$$\Delta r_a - \Delta r_b \approx \frac{2(B + (z_b - z_a)/2)}{R} \quad (12)$$

Thus the "blind" heights can be adjusted by selection of the average wavelength $\lambda$ and the interferometer baseline B. In some applications proper selection of the average wavelength $\lambda$ and the interferometer baseline length B will place the "blind" heights out of the range of interest. Thus no additional steps need be taken to deal with "blind" heights in some instances.

Figure 5:
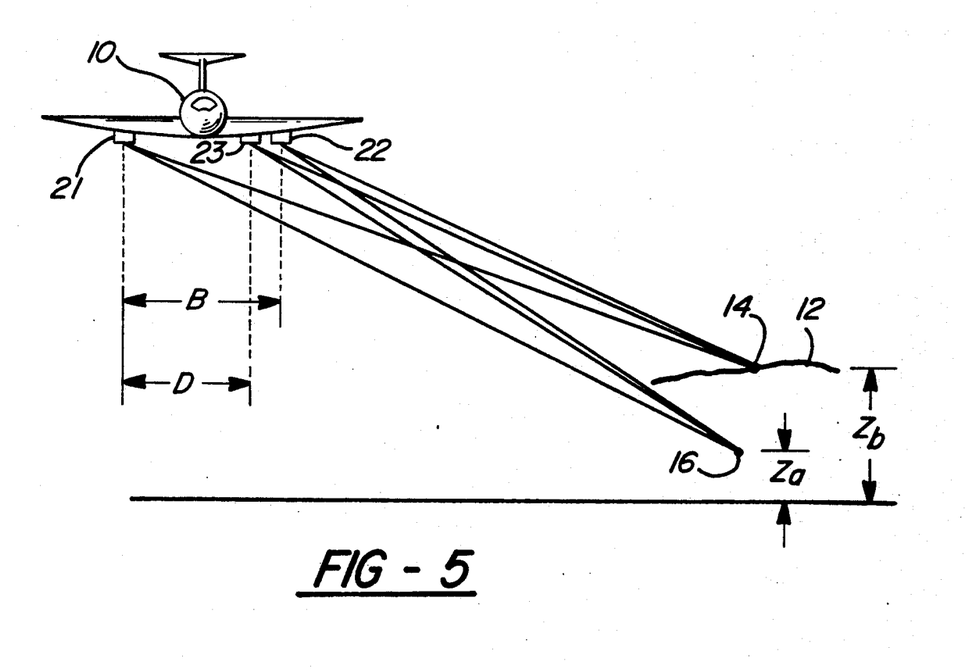
FIG. 5 illustrates the principle of operation of the present invention employing three synthetic aperture radar antennas to resolve blind heights.

In other instances the average wavelength $\lambda$ and the interferometer baseline length B are constrained by factors which cannot be altered to shift the "blind" heights outside the range of interest. In such cases it is preferable to provide additional hardware to deal with potential non-surface objects at the "blind" heights. FIG. 5 illustrates a technique for handling "blind" heights using a third antenna 23. This third antenna 23 is disposed at a distance D from the first antenna 21 and forms a second interferometer baseline. Third antenna 23 receives echo returns from surface point 14 and from subsurface object 16 in the same manner as antennas 21 and 22.

Figure 6:
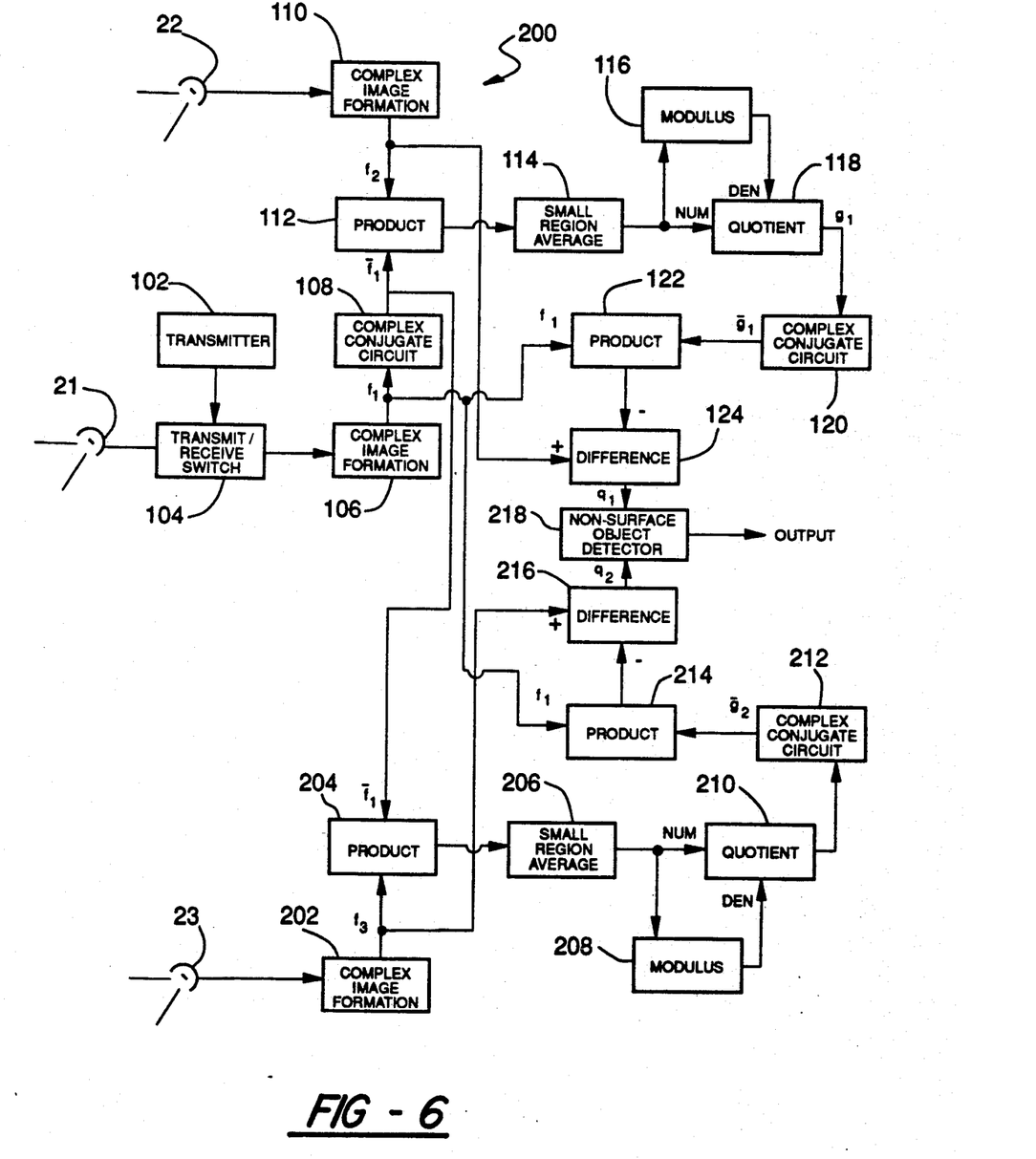
FIG. 6 illustrates in block diagram form an apparatus practicing the embodiment of the invention illustrated in FIG. 5.

FIG. 6 illustrates in block diagram form apparatus 200 which employs three antennas. This apparatus is similar to apparatus 100 illustrated in FIG. 3. Apparatus 200 includes an additional processing channel for the interferometer formed of antennas 21 and 23. These additional circuits form the quantity $q_2$ which is zero except upon detection of a non-surface object by the interferometer including antennas 21 and 23.

Complex image formation receiver 202 is similar to complex image formation receivers 106 and 110 previously described. Complex image formation receiver 202 forms the complex number function f for each slant range and Doppler frequency resolution cell. Product circuit 204 forms the product $f_2 \times \bar{f}_1$ and is similar to product circuit 112.

Small region average circuit 206, modulus circuit 208 and quotient circuit 210 from the phase difference function $g_2$. These circuits operate in the same manner as small region average circuit 114, modulus circuit 116 and quotient circuit 118, respectively, which have been previously described.

Complex conjugate circuit 212 forms the complex conjugate of the phase difference function $g_2$. Product circuit 214 forms the product $f_1\bar{g}_2$ for each resolution cell. Lastly, difference circuit 216 forms the quantity $q_2 = f_3 f_1 \bar{g}$ for each resolution cell. Non-surface object detector 218 receives the quantity $q_1 = f_2 - f_1\bar{g}_1$ from difference circuit 124 and the quantity $q_2 = f_3 - f_1\bar{g}_2$ from difference circuit 216. Non-surface object detector 218 employs the quantities $q_1$ and $q_2$ to determine if there is a non-surface object in each resolution cell in slant range and Doppler frequency. In most cases both quantities $q_1$ and $q_2$ will indicate the presence of a non-surface object. In some few cases only one of the quantities $q_1$ and $q_2$ will indicate the presence of a non-surface object because the non-surface object is at a "blind" height to the other interferometer. Non-surface object detector 218 in any event gives a response indicating detection of a non-surface object by either of the quantities $q_1$ or $q_2$.

Although the apparatus 200 illustrated in FIGS. 5 and 6 has been described in conjunction with synthetic aperture radar, those skilled in the art would realize that this second interferometer baseline technique is also applicable to sonar.

Figure 7:
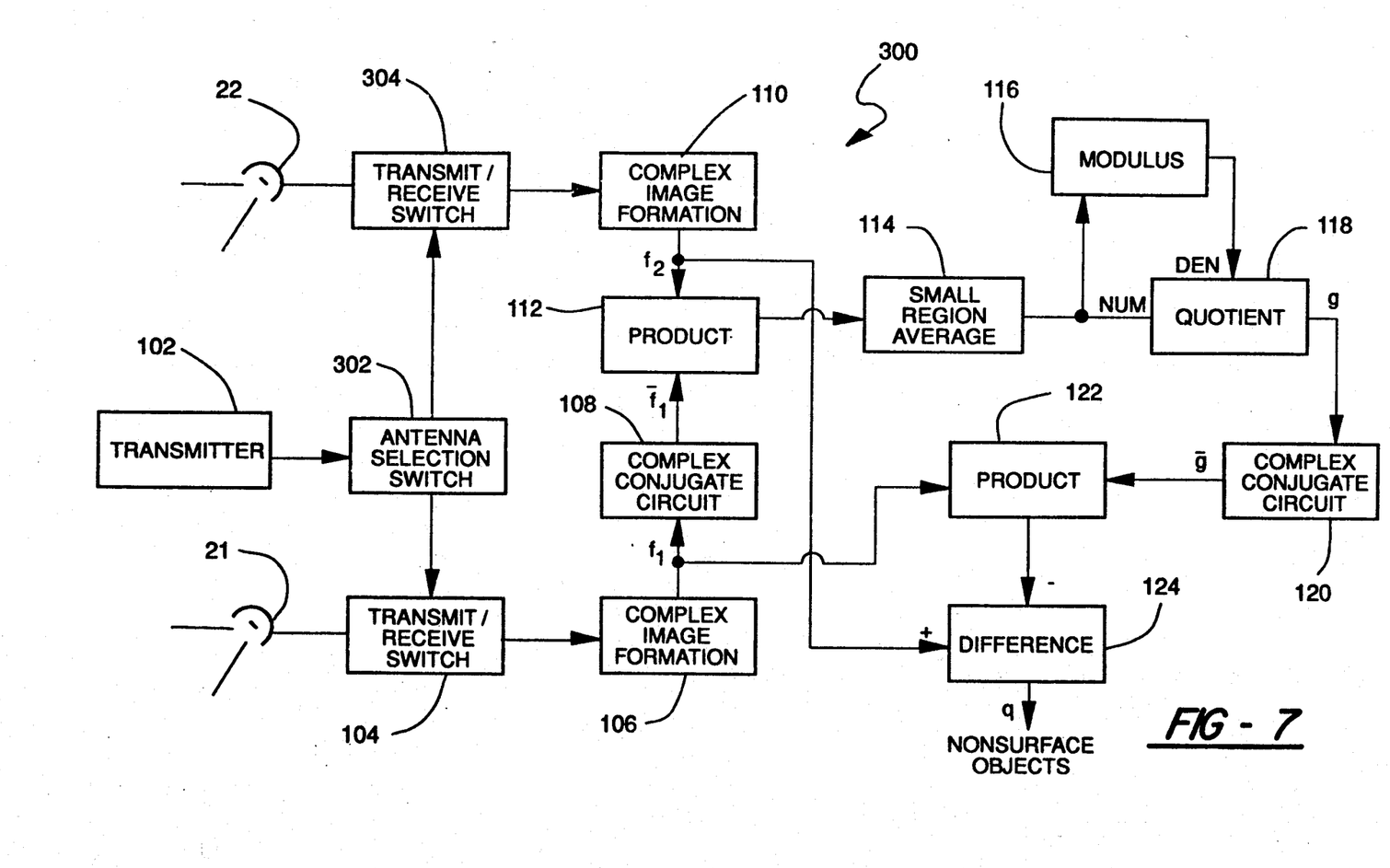
FIG. 7 illustrates in block diagram form an alternative apparatus for practicing this invention.

FIG. 7 illustrates a block diagram of an alternative apparatus 300. Alternative apparatus 300 differs from apparatus 100 in the radar transmissions. Apparatus 300 provides a manner for transmission via both antennas 21 and 22. Transmitter 102 is coupled to antenna selection switch 302. Antenna selection switch 302 supplies the radar transmission from transmitter 102 either to transmit/receive switch 104 or to transmit/receive switch 304. It is preferable to alternate transmission from antenna 21 and 22 by alternating coupling transmitter to transmit/receive switches 104 and 304. The complex image formation receiver 106 and 108 may also be employed alternately. Thus a radar pulse is transmitted by antenna 21 and the echo return received on antenna 21, and next a radar pulse is transmitted by antenna 22 and the echo return received on antenna 22.

This technique has the advantage of enhancing the resolution of the phase difference in the interferometer. The enhanced resolution is due to the doubled signal path in the two transmitter case. In the single transmitter case the only path length difference which can contribute to the phase difference $\Delta\phi$ occurs during the echo return. In the two transmitter case path length differences occur in both the transmission path and in the echo return path. This enhanced resolution permits better separation of the surface and non-surface returns from the same basic equipment or production of equal quality separation form less sophisticated equipment.

It is feasible to employ the echo returns from both antennas 21 and 22 for each transmission regardless of the source antenna. The receiver noise from the two antennas is independent. Thus this additional data, though of a lesser resolution, can be used to reduce the signal to noise ratio in the complex image formation.

I claim:

1. A method of detecting non-surface objects employing a platform including first and second transducers, the first and second transducers each having a predetermined field of view and together forming an interferometer baseline, said method comprising the steps of:
   moving the platform substantially perpendicular to a line though the first and second transducers,
   repeatedly transmitting a radiant signal via at least one of the first and second transducers;
   receiving reflections of each of the transmitted radiant signals via the predetermined field of view of at least one of the first and second transducers;
   forming first synthetic aperture complex image data for a plurality of resolution cells in slant range and Doppler frequency from radiant reflections received by the first transducer employing plural transmitted radiant signals;
   forming second synthetic aperture complex image data for a plurality of resolution cells in slant range and Doppler frequency from radiant reflections received by the second transducer employing plural transmitted radiant signals;
   determining the complex phase factor between said first and second synthetic aperture complex image data for each resolution cell in the absence of non-surface objects;
   multiplying one of said first and second synthetic aperture complex image data of each resolution cell by the complex conjugate of the complex image data of the corresponding resolution cell of said complex phase factor, thereby forming a first product signal for each resolution cell; and
   subtracting said first product signal of each resolution cell from the other of said first and second synthetic aperture complex image data of the corresponding resolution cell, thereby forming a difference signal for each resolution cell which is substantially zero except in the presence of a non-surface object.

2. The method detecting non-surface objects as claimed in claim 1, wherein:
   said step of determining the complex phase factor between said first and second synthetic aperture complex image data includes
   multiplying one of said first and second synthetic aperture complex image data of each resolution cell by the complex conjugate of the other of said first and second synthetic aperture complex images of the corresponding resolution cell, thereby forming a second product signal for each resolution cell,
   averaging said second product signal over a small region of adjacent resolution cells, thereby producing a small region averaged signal for each resolution cell,
   extracting the modulus of said small region averaged signal of each resolution cell, thereby producing a modulus signal for each resolution cell,
   dividing said small region averaged signal of each resolution cell by said modulus signal of the corresponding resolution cell, thereby producing said complex phase factor for each resolution cell.

3. The method of detecting non-surface objects as claimed in claim 2, wherein:

said step of averaging said second product signal over a small region of adjacent resolution cells includes averaging said second product signal over the eight peripheral resolution cells of a three by three matrix of resolution cells centered on the corresponding resolution cell.

4. The method of detecting non-surface objects as claimed in claim 2, wherein:
said step of averaging said second product signal over a small region of adjacent resolution cells includes omitting from the average said second product signal of any resolution cells previously determined to contain a non-surface object.

5. The method of detecting non-surface objects as claimed in claim 1, wherein:
the first and second transducers are respective first and second radar antennas; and
said step of repeatedly transmitting a radiant signal consists of repeatedly transmitting a radar signal.

6. The method of detecting non-surface objects as claimed in claim 1, wherein:
the first and second transducers are respective first and second electro-acoustic transducers; and
said step of repeatedly transmitting a radiant signal consists of repeatedly transmitting a sonar signal.

7. The method of detecting non-surface objects as claimed in claim 1, wherein:
said step of repeatedly transmitting a radiant signal via at least one of the first and second transducers consists of repeatedly transmitting a radiant signal via the first transducer;
said step of receiving reflections of each of said transmitted radiant signals via the predetermined field of view of at least one of the first and second transducers consists of receiving reflections of each of said transmitted radar signals via both the first and second transducers.

8. The method of detecting non-surface objects as claimed in claim 1, wherein:
said step of repeatedly transmitting a radiant signal via at least one of the first and second transducers consists of alternately transmitting a radiant signal via the first transducer and then via the second transducer;
said step of receiving reflections of each of said transmitted radiant signals via the predetermined field of view of at least one of the first and second transducers consists of receiving reflections of each of said transmitted radar signals via the transmitting transducer.

9. The method of detecting non-surface objects as claimed in claim 1, wherein:
said step of repeatedly transmitting a radiant signal via at least one of the first and second transducers consists of alternately transmitting a radiant signal via the first transducer and then via the second transducer;
said step of receiving reflections of each of said transmitted radiant signals via the predetermined field of view of at least one of the first and second transducers consists of receiving reflections of each of said transmitted radiant signals via both the first and second transducer.

10. The method of detecting non-surface objects as claimed in claim 1 wherein the platform further includes a third transducer having the predetermined field of view and forming with the first transducer a second interferometer baseline, said method further including the steps of:
receiving reflections of each of said transmitted radiant signals via the predetermined field of view of the third transducer;
forming a third synthetic aperture complex image data for a plurality of resolution cells in slant range and Doppler frequency from radiant reflections received by the third transducer employing plural transmitted radiant signals;
determining the second complex phase factor between the first and third synthetic aperture complex image data for each resolution cell in the absence of non-surface objects;
multiplying said first synthetic aperture complex image data of each resolution cell by the complex conjugate of the complex image data of the corresponding resolution cell of said second complex phase factor, thereby forming a third product signal for each resolution cell;
subtracting said third product signal of each resolution cell from the said first synthetic aperture complex image data of the corresponding resolution cell, thereby forming a second difference signal; and
determining the presence of a non-surface object from said difference signal and said second difference signal.

11. The method detecting non-surface objects as claimed in claim 10, wherein:
said step of determining the second complex phase factor between said first and third synthetic aperture complex image data includes
multiplying said third synthetic aperture complex image data of each resolution cell by the complex conjugate of said first synthetic aperture complex image data of the corresponding resolution cell, thereby forming a fourth product signal for each resolution cell,
averaging said fourth product signal over a small region of adjacent resolution cells, thereby producing a second small region averaged signal for each resolution cell,
extracting the modulus of said second small region averaged signal of each resolution cell, thereby producing a second modulus signal for each resolution cell,
dividing said second small region averaged signal of each resolution cell by said second modulus signal of the corresponding resolution cell, thereby producing said second complex phase factor for each resolution cell.

12. The method of detecting non-surface objects as claimed in claim 11, wherein:
said step of averaging said fourth product signal over a small region of adjacent resolution cells includes averaging said fourth product signal over the eight peripheral resolution cells of a three by three matrix of resolution cells centered on the corresponding resolution cell.

13. The method of detecting non-surface objects as claimed in claim 11, wherein:
said step of averaging said fourth product signal over a small region of adjacent resolution cells includes omitting from the average said fourth product signal of any resolution cells previously determined to contain a non-surface object.

14. A non-surface object detection apparatus used with a moving platform comprising:
a first transducer having a predetermined field of view off the axis of motion of the moving platform;
a second transducer a predetermined distance from the first transducer having said predetermined field of view;
a transmitter connected to at least one of the first and second transducers for repeatedly transmitting a radiant signal via said at least one of said first and second transducers;
a first receiver connected to said first transducer for forming first synthetic aperture complex image data for each of a plurality of resolution cells in slant range and Doppler frequency from reflections received by said first transducer employing plural transmitted radiant signals;
a second receiver connected to said second transducer for forming second synthetic aperture complex image data for each of a plurality of resolution cells in slant range and Doppler frequency from reflections received by said second transducer employing plural transmitted radiant signals;
a complex phase factor means connected to said first and second receivers for determining the complex phase factor between said first and second and second complex image data for each resolution cell in the absence of non-surface objects, thereby producing a complex phase factor signal for each resolution cell;
a complex conjugate means connected to said complex phase factor means for forming the complex conjugate of said complex phase factor signal of each resolution cell, thereby forming a complex conjugant signal of each resolution cell;
a product means connected to said first receiver and said complex conjugate means for multiplying said complex conjugate signal of each resolution cell by said first synthetic aperture complex image data of the corresponding resolution cell, thereby forming a product signal for each resolution cell; and
a difference means connected to said second receiver and said product means for subtracting said product signal of each resolution cell from said second synthetic aperture complex image data of the corresponding resolution cell, thereby forming a difference signal for each resolution cell which is substantially zero except in the presence of a non-surface object.

15. The non-surface object detection apparatus as claimed in claim 14, wherein:
said complex phase factor means includes
a second complex conjugate means connected to said first receiver for forming the complex conjugate of said first synthetic aperture complex image data of each resolution cell,
a second product means connected to said second receiver and said second complex conjugate means for multiplying said second synthetic aperture complex image data for each resolution cell by the complex conjugant of said first synthetic aperture complex image data of the corresponding resolution cell, thereby producing a second product signal for each resolution cell,
a small region averaging means connected to said second product means for averaging said second product signal for a small region of resolution cells surrounding each resolution cell, thereby producing a small region averaged signal,
a modulus means connected to said small region averaging means for extracting the modulus of said small region averaged signal for each resolution cell, thereby producing a modulus signal for each resolution cell, and
a quotient means connected to said small region averaging means and said modulus means for dividing said small region averaged signal for each resolution cell by said modulus signal of the corresponding resolution cell, thereby producing said complex phase factor signal for each resolution cell.

16. The non-surface object detection apparatus as claimed in claim 15, wherein:
said small region averaging means averages said product signals over the eight peripheral resolution cells of a three by three matrix of resolution cells centered on the corresponding resolution cell.

17. The non-surface object detection apparatus as claimed in claim 15, wherein:
said small region averaging means averages said product signal omitting from the average any resolution cells previously determined to contain a non-surface object.

18. The non-surface object detection apparatus as claimed in claim 14, wherein:
said first and second transducers are respective first and second radar antennas; and
said step of repeatedly transmitting a radiant signal consists of repeatedly transmitting a radar signal.

19. The non-surface object detection apparatus as claimed in claim 14, wherein:
said first and second transducers are respective first and second electro-acoustic transducers; and
said step of repeatedly transmitting a radiant signal consists of repeatedly transmitting a sonar signal.

20. The non-surface object detection apparatus as claimed in claim 14, further comprising:
a transmit/receive switch connected to said first transducer, said transmitter and said first receiver for alternately coupling said transmitter to said first transducer for transmitting a radiant pulse and coupling said first receiver to said first transducer for forming first synthetic aperture complex image data from reflections received by said first transducer.

21. The non-surface object detection apparatus as claimed in claim 14, further comprising:
an transducer selection switch having an input connected to said transmitter and first and second outputs for alternately connecting said transmitter to said first and second outputs;
a first transmit/receive switch connected to said first transducer, said first receiver and said transducer selection switch for alternately coupling said transducer selection switch to said first transducer for transmitting a radiant pulse and coupling said first receiver to said first transducer for forming first synthetic aperture complex image data from reflections received by said first transducer; and
a second transmit/receive switch connected to said second transducer, said second receiver and said transducer selection switch for alternately coupling said transducer selection switch to said second transducer for transmitting a radiant pulse and coupling said second receiver to said second transducer for forming second synthetic aperture complex image data from reflections received by said second transducer.

22. The non-surface object detection apparatus as claimed in claim 14, further comprising:
   a third transducer having said predetermined field of view off the axis of motion of the moving platform;
   a third receiver connected to said third transducer for forming third synthetic aperture complex image data for each of a plurality of resolution cells in slant range and Doppler frequency from reflections received by said third transducer employing plural transmitted radiant signals;
   a second complex phase factor means connected to said first and third receivers for determining the second complex phase factor between said first and third complex image data for each resolution cell the absence of nonsurface objects, thereby producing a second complex phase factor signal for each resolution cell;
   a second complex conjugate means connected to said second complex phase factor means for forming the complex conjugate of said second complex phase factor signal of each resolution cell, thereby forming a second complex conjugant signal of each resolution cell;
   a third product means connected to said first receiver and said second complex conjugate means for multiplying said second complex conjugate signal of each resolution cell by said first synthetic aperture complex image data of the corresponding resolution cell, thereby forming a second product signal for each resolution cell;
   a second difference means connected to said third receiver and said second product means for subtracting said second product signal of each resolution cell from said third synthetic aperture complex image data of the corresponding resolution cell, thereby forming a second difference signal for each resolution cell; and
   a non-surface object detector connected to said difference means and said second difference means for determining the presence of a non-surface object from said difference signal and said second difference signal.

23. The non-surface object detection apparatus as claimed in claim 22, wherein:
   said second complex phase factor means includes
      a fourth product means connected to said third receiver and said second complex conjugate means for multiplying said third synthetic aperture complex image data for each resolution cell by the complex conjugant of said first synthetic aperture complex image data of the corresponding resolution cell, thereby producing a fourth product signal for each resolution cell,
      a second small region averaging means connected to said fourth product means for averaging said fourth product signal for a small region of resolution cells surrounding each resolution cell, thereby producing a second small region averaged signal,
      a second modulus means connected to said second small region averaging means for extracting the modulus of said second small region averaged signal for each resolution cell, thereby producing a second modulus signal for each resolution cell, and
      a second quotient means connected to said second small region averaging means and said second modulus means for dividing said second small region averaged signal for each resolution cell by said second modulus signal of the corresponding resolution cell, thereby producing said second complex phase factor signal for each resolution cell.

24. The non-surface object detection apparatus as claimed in claim 22, wherein:
   said second small region averaging means averages said second product signals over the eight peripheral resolution cells of a three by three matrix of resolution cells centered on the corresponding resolution cell.

25. The non-surface object detection apparatus as claimed in claim 22, wherein:
   said second small region averaging means averages said second product signal omitting from the average any resolution cells previously determined to contain a non-surface object.

* * * * *

UNITED STATES PATENT AND TRADEMARK OFFICE
CERTIFICATE OF CORRECTION

PATENT NO. : 5,160,931
DATED : 11/03/92
INVENTOR(S) : William Brown

It is certified that error appears in the above-indentified patent and that said Letters Patent is hereby corrected as shown below:

Column 3, Line 66, Delete "$be^{jkr1b}$" Insert --$be^{jkr_{1b}}$--
Column 4, Line 1, Delete "$be^{jkr2b}$" Insert --$be^{jkr_{2b}}$--
Column 4, Line 20, Delete "$(r_{1b}-r2b)$" Insert --$(r_{1b}-r_{2b})$--
Column 4, Line 34, Delete "$e^{-jkr\Delta r_b}$" Insert --$e^{-jk\Delta r_b}$--
Column 4, Line 46, Delete "$(1-e^{jk(\Delta r_a - \Delta rb)}$"
    Insert --$1-e^{jk(\Delta r_a - \Delta rb}$--
Column 4, Line 58, Delete ".." Insert --.--
Column 5, Line 27, Delete "=" Insert --$\approx$--

Column 7, Line 10, Delete "$f_2$" Insert --$\bar{f}_2$--
Column 7, Line 10, Delete "$e^{j\phi 1}$" Insert --$e^{j\phi_1}$--
Column 7, Line 12, Delete "$e^{j\phi 1}$" Insert --$e^{j\phi_1}$--
Column 7, Line 59, Delete "$\bar{g}g$" Insert --$\bar{g}$--
Column 8, Line 30, Delete ")$\Delta r_a$" Insert --($\Delta r_a$--
Column 8, Line 31-32, Delete "(because K=2λ/π)"
    Insert --λ(because K=2π/λ)--

UNITED STATES PATENT AND TRADEMARK OFFICE
CERTIFICATE OF CORRECTION

PATENT NO. : 5,160,931
DATED : 11/03/92
INVENTOR(S) : William Brown

It is certified that error appears in the above-indentified patent and that said Letters Patent is hereby corrected as shown below:

Column 9, Line 2, Delete "f" Insert --$f_3$--
Column 9, Line 16, Delete "q2=$f_3 f_1 \bar{q}$" Insert --$q_2 = f_3 - f_1 \bar{g}_2$--

Signed and Sealed this

Fourteenth Day of December, 1993

Attest:

BRUCE LEHMAN

Attesting Officer

Commissioner of Patents and Trademarks